Figures 1, 2:
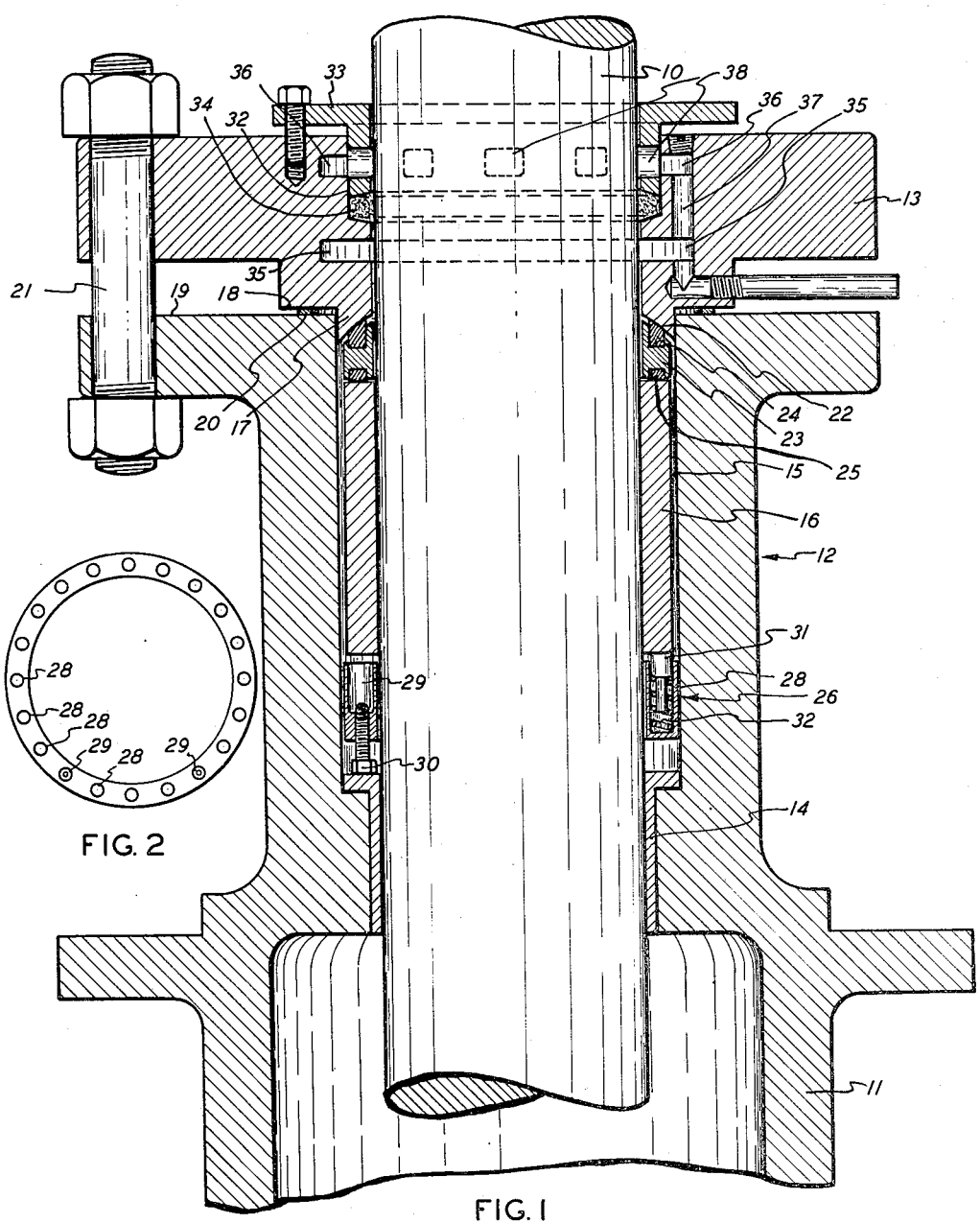

Feb. 4, 1941.  W. J. MacARTHUR  2,230,501
PUMP PACKING
Filed July 1, 1939

WILLIAM J. MacARTHUR
INVENTOR

ATTORNEY

Patented Feb. 4, 1941

2,230,501

UNITED STATES PATENT OFFICE 2,230,501

PUMP PACKING

William J. MacArthur, Los Angeles, Calif.

Application July 1, 1939, Serial No. 282,442

2 Claims. (Cl. 286—30)

The present invention is an improvement over the structure described in U. S. Patent 1,831,572 which issued to me November 10, 1931.

The invention is best described with reference to the attached drawing, showing in Fig. 1 the improved packing box in longitudinal section. Fig. 2 is an end view of the tension ring.

Referring to the drawing, 10 is a pump rod which may be revolvable as in a centrifugal pump or reciprocating as in a plunger or piston pump, 11 is a broken portion of the pump end, 12 is the packing box, and 13 a flanged end attached thereto.

The inner end of the packing box is bored to receive a bushing 14 which in turn is bored to a free sliding fit on rod 10 and the outer end is bored as at 15 to a greater diameter to accommodate the packing ring 16 and other elements to be described. The inner face of gland 13 is provided with a projection 17 fitting within the end of bore 15 and with a shoulder 18 having its inner face parallel to the squared outer face 19 of the packing box. A copper or other gasket 20 placed between this shoulder and the face of the box suffices to prevent leakage underneath the gland when the holding bolts 21 are drawn tight.

The packing ring 16 is a solid, rigid ring of steel or other hard metal with squared and faced ends. This ring is a snug sliding fit on rod 10 and if not so fitted, will not function to produce the results which I obtain. The outer diameter of the ring must be materially less than the inner diameter of bore 15 to allow for free lateral movement of the ring within the box. A radial clearance of at least 1/32 inch should be allowed and in large units this clearance may be increased to 1/16 inch.

The inner end of projection 17 is formed to the curvature of a spherical arc as at 22, this arc having its center in the axis of rod 10. Into this arcuate curvature is fitted a socket ring 23 having its outer end face generally conformable to face 22 and its inner end face squared off to conform with the outer end face of ring 16. The two end faces of the socket ring are grooved and the grooves provided with projecting rings 24 and 25 of a suitable bearing metal such as hard bronze. The projecting faces of these rings are carefully formed and preferably ground to leak-tight engagement with the corresponding faces of projection 17 and ring 16. The socket ring also should be of materially less diameter than bore 15 in order to avoid cramping or binding on rod 10 on which it is fitted loosely.

During the discharge stroke of a reciprocating pump the packing ring 16 is held against the socket ring, and that ring against the gland, by the pressure of fluid within the pump. This pressure reverses in direction during the suction stroke and if the packing ring is not retained, it will follow the rod to the other end of the box and will hammer violently at each reversal in direction.

To prevent this movement I have provided the adjustable tension ring generally indicated at 26, this device being an improvement over the tension means described in my U. S. Patent 1,831,571, November 10, 1931.

The tension ring consists of a hard metal ring 26 loosely fitting over rod 10 and within bore 15, this ring being drilled from its upper end to form a plurality of sockets 28 and 29, as in Fig. 2. Every third, fourth, or fifth of these sockets (numbered 29) is empty but is drilled and tapped at its lower end to receive an adjusting screw 30. The remainder of the sockets (numbered 28) are fitted each with a small plunger 31 urged outwardly by an open coil spring 32. These springs acting on the plungers urge packing ring 16 against socket ring 23 with a force which is controlled by the adjustment of screws 30. This structure is advantageous over that of the patent in that it permits the application of an even pressure of just the desired amount to the lower end of the packing ring.

In pumping oil with a reciprocating pump provided with the packing described there is a slight inevitable leakage between the packing ring and the rod which, while unimportant in amount, is liable to be a nuisance if not taken care of. To avoid this I provide in gland 13 a secondary packing box 32 fitted with a gland 33 which retains a ring 34 of soft packing. Below and above this ring the box 32 is internally grooved as at 35 and 36 and these grooves are connected by a channel 37 with a drain pipe 38 by which leakage is conducted away from the pump. The upper groove 36 communicates with lantern ports 38 formed in the wall of gland 33.

I claim as my invention:

1. In a pump packing assembly having a solid metallic packing ring surrounding the pump rod and a socket ring retained between the outer end of said packing ring and the inner end of a packing gland: a tension ring surrounding the rod and located between the inner end of the packing box and the inner end of said packing ring; a plurality of adjusting screws arranged to adjust the distance between the inner end face of said tension ring and the inner end of the packing box; a plurality of plungers projecting from the outer face of said tension ring to bear on the inner face of said packing ring, and a spring urging each said plunger outwardly.

2. In a pump packing assembly having a solid metallic packing ring surrounding the pump rod and a socket ring retained between the outer end of said packing ring and the inner end of a packing gland: a tension ring surrounding the rod and located between the inner end of the packing box and the inner end of said packing ring; a plurality of spring actuated plungers fitted in said tension ring and bearing on the inner end of said packing ring, and screw-threaded means for adjusting the spacing between the inner end of said tension ring and the inner end of said packing box.

WILLIAM J. MacARTHUR.